Figure 1:
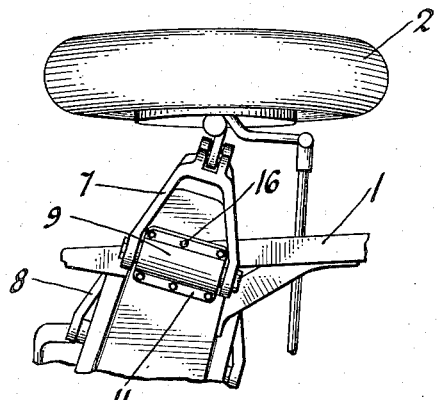

Sept. 7, 1937.  M. OLLEY  2,092,613
RUBBER SUSPENSION
Filed Feb. 2, 1935  2 Sheets-Sheet 1

Inventor
Maurice Olley
By Blackmore, Spencer & Flint
Attorneys

Sept. 7, 1937.    M. OLLEY    2,092,613
RUBBER SUSPENSION
Filed Feb. 2, 1935    2 Sheets-Sheet 2

Inventor
Maurice Olley
By Blackmore, Spencer & Flint
Attorneys

Patented Sept. 7, 1937

2,092,613

UNITED STATES PATENT OFFICE 2,092,613

RUBBER SUSPENSION

Maurice Olley, Detroit, Mich., assignor to General Motors Corporation, Detroit, Mich., a corporation of Delaware Application February 2, 1935, Serial No. 4,649

3 Claims. (Cl. 267—21)

This invention relates to elastic couplings and more particularly to a rubber connection between two parts to be joined.

The invention is embodied in a torsion joint wherein relative oscillation between two members is accommodated by rubber acting in shear. Shear joints have been proposed heretofore in which a rubber sleeve is fixed on its inside and outside surfaces to a central pin and an outer cylinder, respectively. In such proposal most of the rubber is toward the periphery of the sleeve where a comparatively large number of particles have the forces distributed among them, while that near the central pin, being such a relatively small proportion of the whole, is subjected to terrific stretching strain, and since the area of surface engaged by the central pin is materially less than that engaged by the outer cylinder, the bond tears or breaks loose under the severe stresses applied to it. More simply stated the highest stress in the rubber is at the inside of the sleeve where the area of adhesion is least. Inasmuch as the rubber is not stressed evenly throughout its volume, maximum work for a given volume of rubber is not had. This shortcoming has retarded the full enjoyment of the well recognized benefits of rubber torsion joints.

The present invention aims to avoid difficulties heretofore encountered and to provide a practical construction which eliminates concentration of strains and insures maximum work from a given volume of rubber by stressing each particle equally.

More particularly, the invention contemplates, in a specific embodiment, the provision of a compact unit assembly in which the inner and outer members have a series of radial ribs with rubber bonded to cooperating side faces of the ribs and which mating faces diverge outwardly so that the width of the rubber therebetween enlarges as the distance from the center increases. Since for a given degree of relative rotation the length of an arc is dependent upon its distance from the axis it will be apparent that the movement near the periphery of the rubber is considerably greater than it is toward the center, and that the difference is compensated for by reason of the varying width of the rubber.

Proper predetermination of the inclined relation of the side faces will result in substantially equal distribution of strain on the individual rubber particles and all particles are tensioned or stretched to the same extent. Theoretically, the inclined faces of the rubber when projected should intersect the axis of oscillation, whereby the thickness of the rubber varies in proportion to the distance from the axis.

The provision of a large number of axially and closely spaced ribs affords an abundance of surface area to which the rubber may be bonded and this, coupled with the fact that uniform stressing of the rubber decreases the bulk of elastic material needed, makes possible the manufacture of a highly efficient joint of relatively small diameter and general over-all size.

The device will be found especially adaptable as a resilient suspension for vehicles. It replaces the conventional metal leaf or coil spring and possesses sufficient hysteresis loss to partially or completely fulfill the function of the usual separate shock absorber. The hysteresis loss should be more nearly constant in amount than the friction losses of the conventional spring and shock absorber combination.

Figure 2:
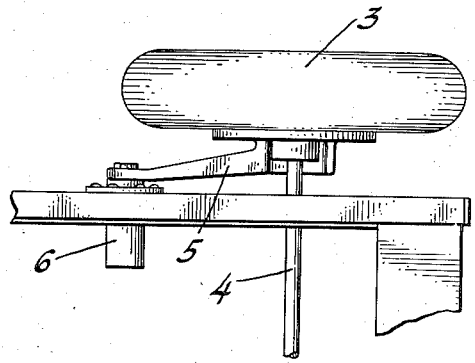
Figure 3:
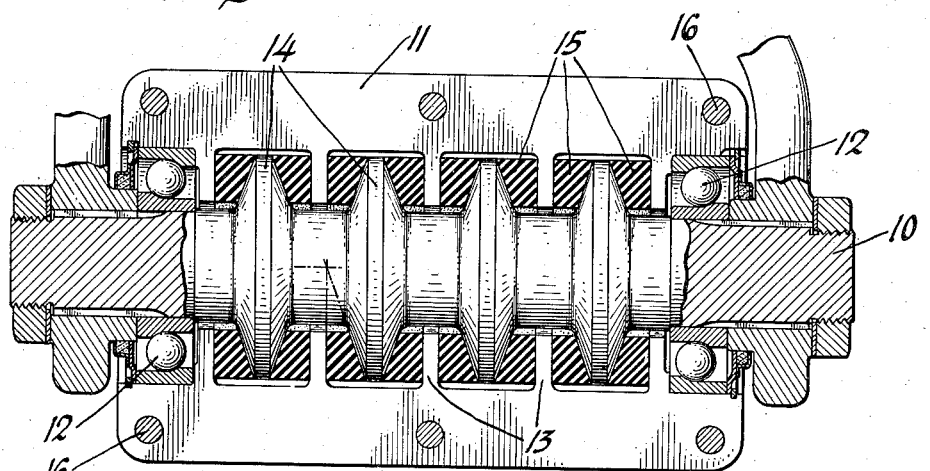
Figure 4:
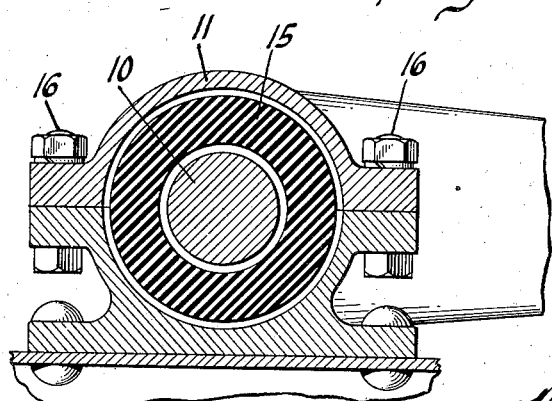
Figure 5:
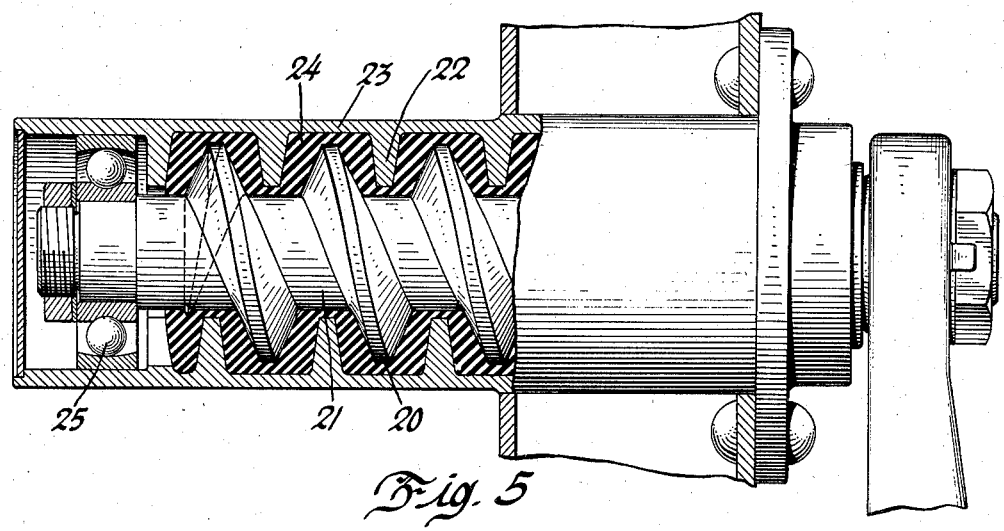
Figure 6:
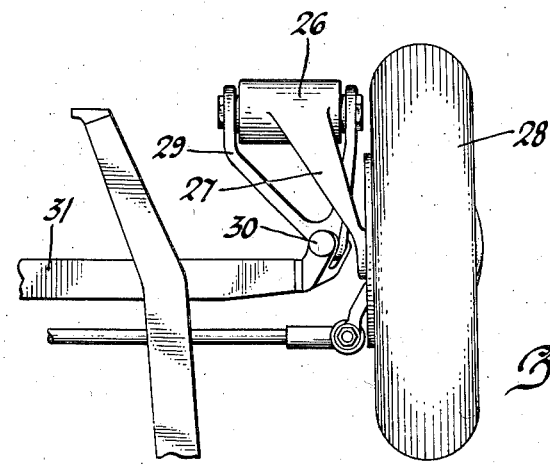
Figure 7:
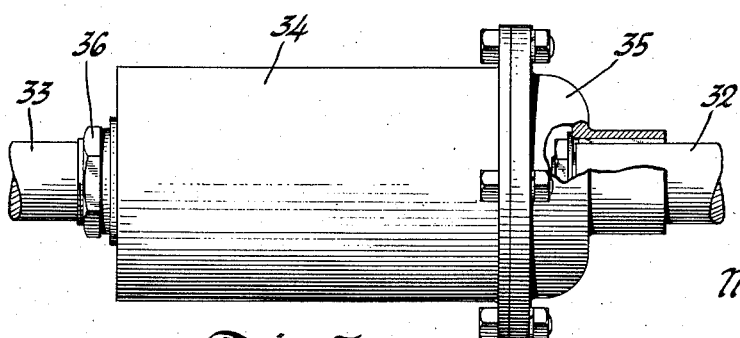

The invention will be best understood upon reference to the accompanying drawings, wherein Figures 1 and 2 are fragmentary top plan views of a forward and a rearward corner, respectively, of the motor vehicle illustrating the invention applied to two different types of independent wheel suspension; Figure 3 is a longitudinal sectional view through the rubber joint shown in Figure 1; Figure 4 is a transverse section through the joint; Figure 5 is an enlarged view, partly in section, of the joint used in the arrangement shown in Figure 2; Figure 6 illustrates another type of independent suspension system, and Figure 7 shows a resilient coupling between two shafts.

For convenience of disclosure the invention is illustrated in connection with independent wheel suspension for which it is especially well suited, but it is to be understood that it may be put to other uses. In the drawings the numeral 1 indicates a vehicle chassis frame supported through lever arms at the front by a steerable wheel 2 and at the rear by the driving wheel 3. The rear wheel 3 is driven by a universally jointed drive shaft 4 extending outwardly from a centrally disposed differential or the like and its supporting rock lever 5 is journaled in the chassis frame as at 6. The front wheel 2 is connected to the chassis frame by a pair of forked levers 7 and 8, with either or both of which may be associated a resilient joint as indicated at 9.

The resilient joint, illustrated in detail in Figure 3, includes the central pin or shaft 10 to the opposite ends of which the forked lever is keyed. This shaft extends through a housing 11, fastened to the chassis frame, and is rotatably supported near opposite ends by anti-friction or ball bearings 12. Interiorly of the hollow casing 11 is formed an axial succession of pockets or grooves defined by a series of spaced ribs or inward projections 13, and each pocket receives one of a series of axially spaced ribs 14 carried by the central pin. Between the radially overlapping and alternately arranged inner and outer ribs 13—14 are a series of rings or convolutions 15 of rubber or other suitable elastic deformable material, which by being bonded to the ribs yieldingly resist relative turning movements between the inner and outer members on the anti-friction bearing 12.

The rubber rings 15 are each of substantially wedge shape in cross section or of increasingly greater width from the center outwardly. Cooperating faces of adjacent ribs conform to the shape of the rubber rings and are inclined in relation to each other or diverge inwardly so that their surfaces when projected intersect on the axis of the pin as is illustrated by the broken lines in Figure 3. For simplicity and economy of manufacture, the inwardly projecting ribs 13 have their sides extending normal to the axis and the angular relation is provided by making the opposite sides of the peripheral ribs 14 of substantially frusto-conical shape.

Inasmuch as it is desired to have surface bonding between only the radially extending faces of the rubber rings and as a vulcanized bond is preferred, it is proposed to coat the side faces of the inner and outer ribs with some facing material to insure a good surface bond. Brass plating will serve this purpose. As a further precaution, the peripheral surface of the pin and the bottom surfaces of the annular grooves may be covered with some material that resists vulcanization. In somewhat exaggerated manner, Figure 3 shows clearance between the inner and outer surfaces of the rubber rings to emphasize the lack of a bond at these places.

By reason of this construction any relative rocking of the inner and outer members will stretch the rubber rings and because the number of rubber particles increases in proportion to the distance away from the axis of rotation the whole of the mass is stressed in a uniform fashion. Every individual rubber particle, therefore, does its full share of work and there is no greater strain on the surface bond at one point than at another. Thus, maximum efficiency is obtained from the rubber and there is little likelihood of failure in use.

To facilitate assembly the outer casing 11 is split longitudinally and the two sections are secured together by fastening blots 16.

As a modification, and in order to avoid the split outer housing, the inner and outer members may be threaded together to produce the modified joint shown in Figure 5. Here a helical rib 20 on the central pin 21 is located within a groove formed by the helical rib 22 on the outer member 23 with rubber cushioning material 24 between and bonded to the sides only of the ribs. Here again the adjacent surfaces of succeeding ribs form an angle to each other and when projected intersect on the axis of oscillation. Anti-friction journal bearings, one of which is indicated at 25, support the central pin within the housing which in turn is mounted in the chassis frame member. In assembling this joint the inner and outer members are threaded together with rubber filling the spaces therebetween for subsequent vulcanization.

It will be obvious, of course, that either the inner or the outer member may be fixed and the other rotatable relative thereto and this reverse arrangement is illustrated in Figure 6 where the outer casing 26 is formed with an arm 27 to which the wheel 28 is mounted, while the central pin is fixed in the forked bracket 29 which is secured by a king pin 30 on the end of the chassis frame member 31.

On the other hand, both the inner and outer members may be rotatable, as will be the case in a flexible drive coupling between two shafts. For example, in Figure 7 are shown two shafts 32 and 33, either of which may be the driving or the driven shaft and the outer casing 34 is secured to the shaft 32 by an end piece 35 bolted to the casing and keyed to the shaft, while the central pin is sleeved on the shaft 33 and held by the nut 36.

From the above description it will be apparent that there is provided an elastic joint possessing maximum efficiency, in that the mass of rubber is worked uniformly throughout, whereby the volume of rubber required is small, which together with the fact that the use of a number of ribs carried alternately by the inner and outer members, affords a large area of surface bond, makes possible a compact assembly to occupy minimum space.

I claim:

1. A torsion joint comprising a central pin, a medially split housing surrounding the pin, a series of projections carried alternately by the pin and housing in radially overlapping relation, means joining the split housing sections in assembled relation to the pin, and a series of rubber rings interposed between succeeding projections and bonded to the sides thereof, said rings being of smaller size in an axial direction near the center than at the perimeter.

2. In a torsion joint, a central pin having a series of axially spaced annular ribs carried thereby, an axially split two-part outer casing surrounding the pin and carrying internal annular ribs to project in radially overlapping and axially spaced relation to the ribs on the pin, and elastic deformable material interposed between and surface bonded to the radial faces of the ribs.

3. In a torsion joint, an axially split two-part outer casing having a series of axially spaced and parallel sided internal grooves, a central pin having a series of annular ribs of frusto-conical section and in axial spaced relation to be received, respectively, in said grooves, means detachably joining the casing parts in embracing relation to the pin and elastic deformable material within each groove and on both sides of the rib located in the groove and surface bonded to the rib and the groove sides.

MAURICE OLLEY.